United States Patent
Zhu et al.

(10) Patent No.: US 12,387,760 B2
(45) Date of Patent: Aug. 12, 2025

(54) VIDEO GENERATION METHOD, APPARATUS, ELECTRONIC DEVICE AND STORAGE MEDIUM

(71) Applicant: Beijing Zitiao Network Technology Co., Ltd., Beijing (CN)

(72) Inventors: Ximin Zhu, Beijing (CN); Yan Liu, Beijing (CN); Zhixuan Wei, Beijing (CN); Qingyuan Hu, Beijing (CN); Guanming Cai, Beijing (CN); Xinghua Zhang, Beijing (CN); Jiaming Li, Beijing (CN); Zhi Chen, Beijing (CN); Kai Li, Beijing (CN); Tianqi Chen, Beijing (CN); Binbin Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/902,706

(22) Filed: Sep. 30, 2024

(65) Prior Publication Data
US 2025/0022485 A1    Jan. 16, 2025

Related U.S. Application Data

(63) Continuation of application No. PCT/CN2023/082244, filed on Mar. 17, 2023.

(30) Foreign Application Priority Data

Mar. 31, 2022   (CN) .......................... 202210346589.5

(51) Int. Cl.
*G11B 27/02*   (2006.01)
(52) U.S. Cl.
CPC .................................. *G11B 27/02* (2013.01)

(58) Field of Classification Search
CPC ....... G11B 27/02; G11B 27/00; G11B 27/022; G11B 27/029; G11B 27/031; G11B 27/036; G06V 20/49; H04N 21/47205
(Continued)

(56) References Cited

U.S. PATENT DOCUMENTS 6,690,878 B1   2/2004   Jeong et al.
10,818,058 B1  10/2020  Gupta et al.
(Continued)

FOREIGN PATENT DOCUMENTS

CN   105872675 A   8/2016
CN   106034210 A   10/2016
(Continued)

OTHER PUBLICATIONS

International Search Report for PCT/CN2023/082244, mailed Jun. 14, 2023, 5 pages.
(Continued)

*Primary Examiner* — Thai Q Tran
*Assistant Examiner* — Nienru Yang
(74) *Attorney, Agent, or Firm* — Astute IP Law Group (57) ABSTRACT

Disclosed in the embodiments of the present disclosure are a video generation method, an apparatus, an electronic device and a storage medium. The method comprises: during an image editing process of subjecting an initial image to a series of image editing operations to obtain a target image, acquiring initial key frames, the initial key frames being intermediate images between the initial image and the target image during the image editing process, the different initial key frames being intermediate images generated when different image editing operations of the series of image editing operations are triggered during the image editing process, and the intermediate images showing editing effects corresponding to the image editing operations; and generating a (Continued)

Acquiring, in an image editing process of subjecting an initial image to a series of image editing operations to obtain a target image, initial key frames which are intermediate state images between the initial image and the target image in the image editing process, wherein a different initial key frame is an intermediate state image when a different image editing operation of the series of image editing operations is triggered in the image editing process, and the intermediate state image presents an editing effect of the corresponding image editing operation  ~110

Generating a target video according to the initial key frames, so as to record an image editing process of the target image  ~120 target video according to the initial key frames so as to record the image editing process of the target image. The present disclosure can be used for recording an image editing process.

20 Claims, 4 Drawing Sheets

(58) Field of Classification Search
USPC .......................................................... 386/278
See application file for complete search history.

(56) References Cited

U.S. PATENT DOCUMENTS

| | | | |
|---|---|---|---|
| 11,086,645 B1 | 8/2021 | Gupta et al. | |
| 2013/0120439 A1 | 5/2013 | Harris et al. | |
| 2015/0302889 A1 | 10/2015 | Chung et al. | |
| 2016/0358629 A1* | 12/2016 | Pribula | H04N 5/772 |
| 2016/0366330 A1* | 12/2016 | Boliek | H04N 23/80 |
| 2017/0178685 A1 | 6/2017 | Zhang | |
| 2018/0276189 A1 | 9/2018 | Bache et al. | |
| 2021/0027510 A1 | 1/2021 | Avoyan et al. | |
| 2021/0099756 A1* | 4/2021 | Gnanapragasam | G06V 20/41 |

FOREIGN PATENT DOCUMENTS

| | | |
|---|---|---|
| CN | 106993093 A | 7/2017 |
| CN | 107992246 A | 5/2018 |
| CN | 110087123 A | 8/2019 |
| CN | 113132690 A | 7/2021 |
| CN | 114025103 A | 2/2022 |
| JP | 2015179224 A | 10/2015 |
| JP | 2016504790 A | 2/2016 |
| JP | 2019029810 A | 2/2019 |

OTHER PUBLICATIONS

Office Action for Japanese Patent Application No. 2024-558008, mailed on Apr. 1, 2025, 10 pages.
Extended European Search Report for European Patent Applciation No. 23777885.7, mailed on Jun. 2, 2025, 11 pages.

* cited by examiner

Acquiring, in an image editing process of subjecting an initial image to a series of image editing operations to obtain a target image, initial key frames which are intermediate state images between the initial image and the target image in the image editing process, wherein a different initial key frame is an intermediate state image when a different image editing operation of the series of image editing operations is triggered in the image editing process, and the intermediate state image presents an editing effect of the corresponding image editing operation ~110

Generating a target video according to the initial key frames, so as to record an image editing process of the target image ~120

VIDEO GENERATION METHOD, APPARATUS, ELECTRONIC DEVICE AND STORAGE MEDIUM

CROSS-REFERENCE TO RELATED APPLICATIONS

The present application is a continuous application of International Application No. PCT/CN2023/082244, filed on Mar. 17, 2023, which is based on and claims priority to Chinese Application No. 202210346589.5 filed on Mar. 31, 2022, the disclosure of both applications is incorporated by reference herein in its entirety.

TECHNICAL FIELD

The present disclosure relates to the field of information technologies, and in particular to a video generation method and apparatus, an electronic device, and a storage medium.

BACKGROUND

With the rapid development of network technologies and mobile terminal technologies, more and more applications adapted to mobile terminals appear, for example, an application of edit type, based on which a user can edit a captured original image.

In some application scenarios, a user may wish to record an image editing process, and obtain a related video which can be used for sharing or teaching.

SUMMARY

In order to solve the above technical problem or at least partially solve the above technical problem, embodiments of the present disclosure provide a video generation method and apparatus, an electronic device, and a storage medium capable of recording an image editing process.

An embodiment of the present disclosure provides a video generation method, which includes:

acquiring, in an image editing process of subjecting an initial image to a series of image editing operations to obtain a target image, initial key frames which are an intermediate state images between the initial image and the target image in the image editing process, wherein a different initial key frame is the intermediate state image when a different image editing operation of the series of image editing operations is triggered in the image editing process, and the intermediate state image presents an editing effect of a corresponding image editing operation;

generating a target video according to the initial key frames, so as to record an image editing process of the target image.

An embodiment of the present disclosure further provides a video generation apparatus, which includes:

an acquisition module for acquiring, in an image editing process of subjecting an initial image to a series of image editing operations to obtain a target image, initial key frames which are intermediate state images between the initial image and the target image in the image editing process, wherein a different initial key frame is an intermediate state image when a different image editing operation of the series of image editing operations is triggered in the image editing process, and the intermediate state image presents an editing effect of the corresponding image editing operation;

a generation module for generating a target video according to the initial key frames, so as to record an image editing process of the target image.

An embodiment of the present disclosure further provides an electronic device, which includes:

one or more processors;

a memory means for storing one or more programs;

wherein, the one or more programs, when executed by the one or more processors, cause the one or more processors to implement one or more steps in the video generation method described above.

An embodiment of the present disclosure further provides a computer readable storage medium with a computer program stored thereon, which, when executed by a processor, implements one or more steps in the video generation method described above.

An embodiment of the present disclosure further provides a computer program, including:

computer readable instructions which, when executed by a processor, cause the processor to implement one or more steps in the video generation method described above.

An embodiment of the present disclosure further provides a computer program product, including computer readable instructions which, when executed by a processor, cause the processor to implement one or more steps in the video generation method descried above.

BRIEF DESCRIPTION OF THE DRAWINGS

The above and other features, advantages, and aspects of various embodiments of the present disclosure will become more apparent by referring to the following specific implementations when taken in conjunction with the accompanying drawings. Throughout the drawings, the same or similar reference numbers represent the same or similar elements. It should be understood that the drawings are schematic and that components and elements are not necessarily drawn to scale.

DETAILED DESCRIPTION

Embodiments of the present disclosure will be described in more detail below with reference to the accompanying drawings. While certain embodiments of the present disclosure are shown in the drawings, it should be understood that the present disclosure can be implemented in various forms and should not be construed as limited to the embodiments set forth herein, but rather are provided for a more thorough and complete understanding of the present disclosure. It should be understood that the drawings and the embodiments of the present disclosure are for illustration purposes only and are not intended to limit the scope of the present disclosure.

It should be understood that the various steps recited in method implementations of the present disclosure can be executed in a different order, and/or executed in parallel. Moreover, method implementations can include additional steps and/or omit executing the illustrated steps. The scope of the present disclosure is not limited in this respect.

The term "including" and variations thereof as used herein are intended to be open-ended, i.e., "including but not limited to". The term "based on" is "based at least in part on". The term "one embodiment" means "at least one embodiment"; the term "another embodiment" means "at least one additional embodiment"; the term "some embodiments" means "at least some embodiments". Related definitions for other terms will be given in the following description.

It is to be noted that "first", "second", and other concepts mentioned in the present disclosure are only used for distinguishing different devices, modules or units, and are not used for limiting the order or interdependence relations of the functions executed by these devices, modules or units.

It is to be noted that references to "one" or "more" in the present disclosure are intended to be illustrative rather than limiting, and that those skilled in the art should understand that it should be understood as "one or more" unless the context clearly indicates otherwise.

The names of messages or information exchanged between apparatuses in the implementations of the present disclosure are for illustrative purposes only, and are not intended to limit the scope of these messages or information.

Figure 1:
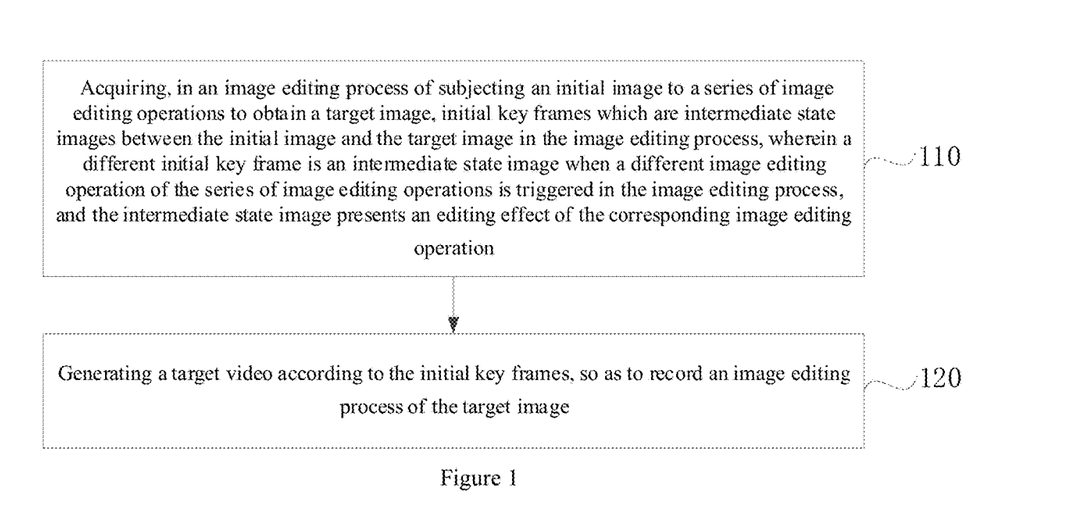
FIG. 1 is a flow diagram of a video watermarking method in an embodiment of the present disclosure.

FIG. 1 is a flow diagram of a video generation method in an embodiment of the present disclosure, where the method can be executed by a video generation apparatus. The apparatus can be implemented by means of software and/or hardware, and can be configured in an electronic device, for example, a terminal, specifically including but not limited to a smart phone, a palm computer, a tablet computer, a wearable device with a display screen, a desktop computer, a notebook computer, an all-in-one machine, a smart home device, and the like. Alternatively, the apparatus can also be configured in a server.

As shown in FIG. 1, the method specifically includes the following steps:

Step 110, acquiring, in an image editing process of subjecting an initial image to a series of image editing operations to obtain a target image, initial key frames which are intermediate state images between the initial image and the target image in the image editing process, wherein a different initial key frame is an intermediate state image when a different image editing operation of the series of image editing operations is triggered in the image editing process, and the intermediate state image presents an editing effect of the corresponding image editing operation.

The initial image can be an image in an album of a user, or an image downloaded from a network disk, or a certain video frame in a to-be-edited video. Image editing can be performed on the initial image with the aid of special image editing software. For example, a user can import a certain image (i.e., the initial image) in an album into the image editing software, whereby to perform image editing on the initial image. Performing image editing on the initial image includes, but is not limited to: adjusting brightness or contrast of the initial image, adding materials (such as stickers, texts) to the initial image, adding effects or filters, or the like.

Generally, an interactive interface of special image editing software is provided with many editing controls, such as a control for adjusting image brightness, a control for adjusting image contrast, a material adding control and the like. The user can implement image editing on the initial image by triggering the corresponding control.

In some optional implementations, in order to effectively record the image editing process performed by the user on the initial image, a frame extraction time for acquiring an initial key frame is defined to ensure that the acquired initial key frame is an intermediate state image for recording a key editing operation or an intermediate state image with the obviously changed editing effect.

Illustratively, the acquiring, in an image editing process of subjecting an initial image to a series of image editing operations to obtain a target image, an initial key frame includes:

determining, when performing an image editing operation for the initial image, a type of the image editing operation; acquiring an initial key frame at the time of triggering the image editing operation if the image editing operation is of a first type; acquiring an initial key frame when receiving an effectiveness confirming instruction or an image editing operation switching instruction after triggering the image editing operation, if the image editing operation is of a second type, wherein, the first type of image editing operation is an operation of changing an original content of the initial image; the second type of image editing operation is an operation of superimposing an effect on an original content of the initial image without changing the original content. For example, a graffiti operation performed on the initial image and an operation of achieving portrait facial remodeling by hand drawing (e.g., face sculpting, eye magnifying) belong to a first type of image editing operations; operations of adjusting the brightness, contrast, light sensation of the target image, adding materials (stickers or texts) to the target image, and adding filters belong to a second type of image editing operations.

Taking an image editing operation of adding a sticker to an initial image as an example, when a user selects a certain sticker option and then triggers an "OK" control, that is, when a system receives a effectiveness confirming instruction, the system triggers a frame extraction logic to acquire an intermediate image at a current time (the intermediate image presents the added sticker), that is, to acquire an initial key frame at a current time.

Illustratively, for example, when a user performs a graffiti operation on the initial image, an initial key frame is acquired at a time when the user triggers the graffiti operation. The initial key frame is an intermediate state image corresponding to the time of triggering the image editing operation, and the intermediate state image presents an editing effect (e.g., image picture with graffiti) corresponding to the image editing operation (e.g., the graffiti operation). Further, the intermediate state image can also present a trigger action (e.g., a user's graffiti action) corresponding to the image editing operation.

In an image editing process of subjecting an initial image to a series of image editing operations to obtain a target image, initial key frames are acquired, and then a target video is generated based on the initial key frames, so that the recording of the image editing process performed by the user on the initial image can be realized.

In summary, the initial key frames are acquired based on a preset frame extraction policy in an image editing process of subjecting an initial image to a series of image editing operations to obtain a target image.

Figure 2:
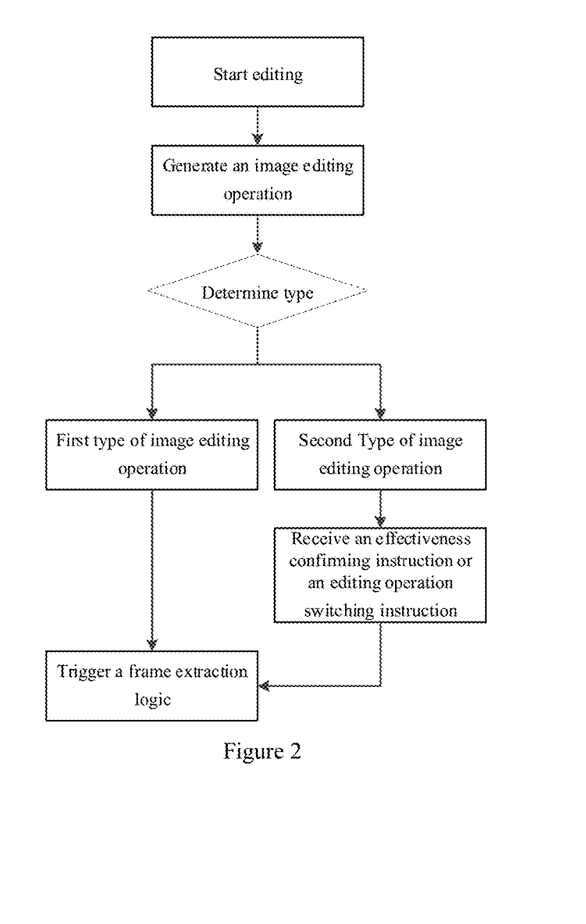
FIG. 2 is a schematic flow diagram of triggering a preset frame extraction policy in an embodiment of the present disclosure.

Illustratively, refer to a schematic flow diagram of triggering a preset frame extraction policy shown in FIG. 2, which specifically includes: starting to perform image editing on an initial image, generating an image editing operation, determining a type of the image editing operation, and directly triggering a frame extraction logic, if the image editing operation is of a first type; triggering the frame extraction logic when an effectiveness confirming instruction or an editing operation switching instruction is received, if the image editing operation is of a second type.

In some optional implementations, the acquiring initial key frames can further include: extraction is performed according to a fixed number of steps, for example, the number of image editing operations is recorded by a counter; every time the image editing operation is triggered by the user, the count value of the counter increments; when the count value reaches a preset value (for example, the preset value is 3, which is adjustable), the frame extraction logic is executed once.

Alternatively, the content change degree of the initial image is determined through an intelligent model, and when the content change degree of the initial image reaches a preset value, the frame extraction logic is executed once.

Alternatively, the frame extraction is performed according to a set fixed time length, for example, the frame extraction logic is executed every 10 s.

Step 120, generating a target video according to the initial key frames, so as to record an image editing process of the target image.

In order to further improve the quality of the initial key frame, effectively record the image editing process performed by the user on the initial image, and ensure that the acquired initial key frame is an intermediate state image for recording the key image editing operation or an intermediate state image with the obviously changed editing effect, the initial key frames are filtered and screened after they are acquired, the initial key frames with an unobvious editing effect is deleted, and the initial key frames recording the key image editing operation are reserved, in other words, the initial key frames with the obviously changed editing effect are reserved.

Optionally, before the generating a target video according to the initial key frames, the method further includes:

comparing, for the target key frame among the initial key frames (that is, the target key frame is any one of the initial key frames), a pixel value of a pixel point in the target key frame with a pixel value of a pixel point in a historical key frame closest to the target key frame, wherein the historical key frame is an initial key frame at a previous time of the time corresponding to the target key frame; determining the target key frame as a valid frame, if a number of pixel points with changed pixel values reaches a second preset threshold. Accordingly, the generating a target video according to the initial key frames includes: generating a target video according to the valid frames among the initial key frames.

If the target key frame is a firstly acquired initial key frame, then the historical key frame and the target key frame are the same key frame; if the target key frame is not a firstly acquired initial key frame, the historical key frame is a valid frame at a previous time of the time corresponding to the target key frame.

The above process of determining whether the initial key frame is a valid frame is illustrated. Assuming that a first initial key frame is acquired, since no historical key frame can be referred to, the first initial key frame is determined as a valid frame, and a first valid frame is thus obtained. As time goes by, then a second initial key frame is acquired. At this moment, a pixel value of a pixel point in the second initial key frame is compared with a the pixel value of a pixel point in the first valid frame, and if a number of pixel points with changed pixel values reaches a second preset threshold, then the second initial key frame is determined as a valid frame. Assuming that the second initial key frame is determined as a valid frame through the comparison, a second valid frame is thus obtained. As time goes by, then a third initial key frame is acquired. At this moment, a pixel value of a pixel point in the third initial key frame is compared with a pixel value of a pixel point in the second valid frame (because the second valid frame is closest to the third initial key frame), so as to determine whether the third initial key frame is a valid frame. In a similar way, all the initial key frames are identified so as to reserve valid frames and delete invalid frames.

Further, when the target key frame is determined as the valid frame, the target key frame is transferred from the memory to a local disk, so as to ensure the storage stability of the valid frame and provide a basis for subsequently generating the target video.

Figure 3:
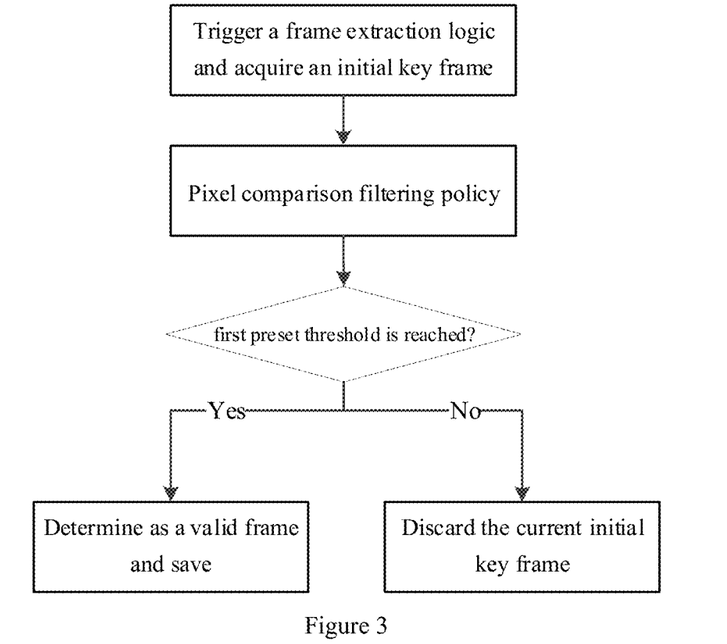
FIG. 3 is a schematic flow diagram of determining whether an extracted initial key frame is a valid frame in an embodiment of the present disclosure.

Illustratively, refer to a schematic flow diagram of determining whether an extracted initial key frame is a valid frame as shown in FIG. 3, which specifically includes: triggering a frame extraction logic, acquiring an initial key frame, determining whether a number of pixel points in the initial key frame, of which pixel values are changed as compared with the pixel values of the pixel points in the historical key frame closest to the initial key frame, reaches a second preset threshold through a pixel comparison filtering policy, determining the initial key frame as a valid frame and saving the initial key frame if the second preset threshold is reached, and discarding the initial key frame instead of saving it if the second preset threshold is not reached.

In order to make the target video short and efficient, when there are a large number of initial key frames, a sparsification process is performed on the initial key frames through a certain policy, so as to avoid the generated target video to be too redundant and have a poor viewing effect.

Further, before the generating a target video according to the initial key frames, the method further includes:

performing a sparsification process on the initial key frames, if the number of the initial key frames reaches a first preset threshold and all the initial key frames are acquired at the time of triggering the first type of image editing operations, so as to control the number of the initial key frames to be less than the first preset threshold.

Taking the first type of image editing operation being a graffiti operation as an example, when the graffiti operation is performed for the initial image, generally a user will continuously perform the graffiti operation, and the process will continuously extract many initial key frames. In order to ensure the effect of the generated target video and make the target video short and efficient, a sparsification process is performed on the many initial key frames.

Optionally, the sparsification process can be performed according to an equal interval selection rule. For example, according to the serial numbers of the acquired initial key frames, the initial key frames with odd serial numbers are reserved, and the initial key frames with even serial numbers are deleted; wherein, the serial numbers of the initial key frames are determined based on acquisition times of the initial key frames, and the initial key frame with an earlier acquisition time has a smaller serial number. Assuming that the first preset threshold is 40 (which is adjustable), when the number of the acquired initial key frames is 39, and when the 40th initial key frame is acquired, a halving process is performed uniformly on the previous 39 initial key frames. For example, a first initial key frame, a third initial key frame, a fifth initial key frame . . . , and the like are selected at an equal interval to process the previous 39 initial key frames into 20 initial key frames, and the 40th initial key frame is taken as the 21st initial key frame after processing, thereby achieving the sparsification process.

In summary, two initial key frames with adjacent acquisition times are determined from among the initial key frames, and one of the two initial key frames is filtered out.

Figure 4:
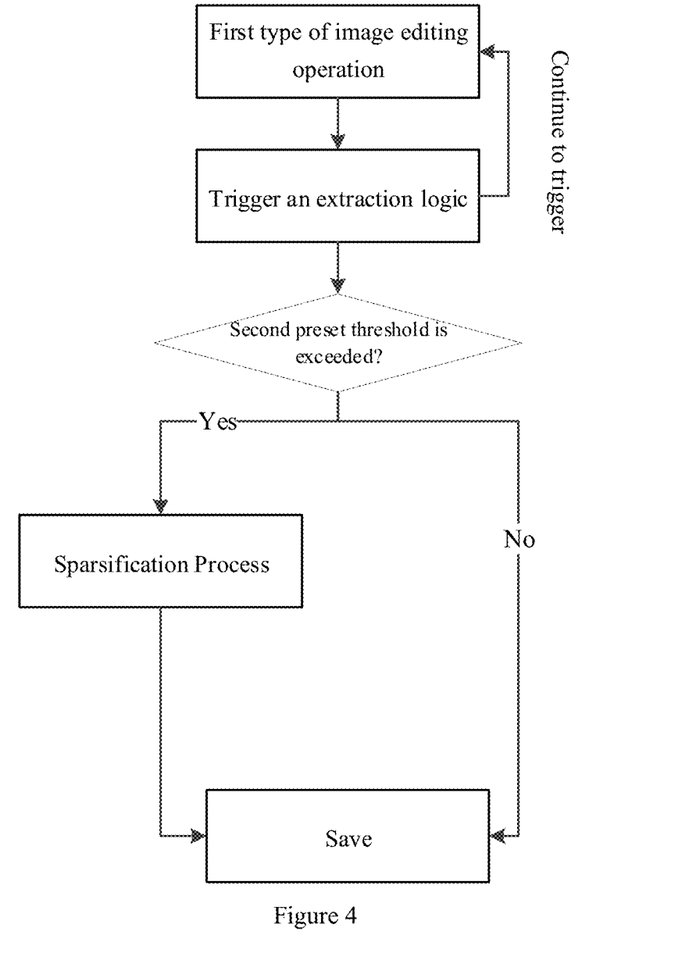
FIG. 4 is a schematic flow diagram of performing a sparsification process in an embodiment of the present disclosure.

Illustratively, refer to a schematic flow diagram of performing a sparsification process as shown in FIG. 4, which includes: directly triggering a frame extracting logic if the image editing operation is of a first type, and continuously triggering a frame extracting logic in the process of performing the first type of image editing operation; determining whether the number of valid frames acquired for the first type of image editing operation reaches a first preset threshold, and performing a sparsification process on the valid frames if the first preset threshold is reached, so as to control the number of the valid frames to be smaller than the first preset threshold.

In some optional implementations, if a total number of the initial key frames reaches a third preset threshold, the sparsification process is performed on all the initial key frames. Specifically, before the generating a target video according to the initial key frames, the method further includes:

performing a sparsification process on the initial key frames based on a preset sparsification policy, if the number of the initial key frames reaches a third preset threshold, so as to control the number of the initial key frames to be less than the third preset threshold.

The performing a sparsification process on the initial key frames based on a preset sparsification policy so as to control the number of initial key frames to be less than the third preset threshold includes:

according to the serial numbers of the initial key frames, reserving the initial key frames with odd serial numbers, and deleting the initial key frames with even serial numbers; wherein, the serial numbers of the initial key frames are determined based on acquisition times of the initial key frames, and the initial key frame with an earlier acquisition time has a smaller serial number.

In summary, The performing a sparsification process on the initial key frames based on a preset sparsification policy so as to control the number of initial key frames to be less than the third preset threshold includes:

determining two initial key frames with adjacent acquisition times from the initial key frames; filtering out one of the two initial key frames, wherein the initial key frame can be directed to a valid frame.

According to the video generation method provided by the embodiment of the present disclosure, by extracting the initial key frames in the image editing process performed on the initial image and performing validity identification on the extracted initial key frames, images that effectively recording the image editing process performed by the user on the initial image and ensuring that the acquired initial key frames record the key editing operations, or alternatively images with the obviously changed editing effect are reserved, and a basis is provided for obtaining a high-quality target video. By controlling the number of valid frames, the target video can have characteristics of simplicity, high efficiency and good viewability, so that the target video has a characteristic of good social sharing, and the internet media content is enriched.

Optionally, the method can further include: sharing the target video, or sending the target video to a preset social media platform.

Optionally, the presentation form of the target video can be animation, video, motion picture, sequence frame or motion effect, and the like. The target video can serve as an image editing tutorial to guide users unfamiliar with image editing. The target video records the complete image retouching process well and has good content viewability.

Figure 5:
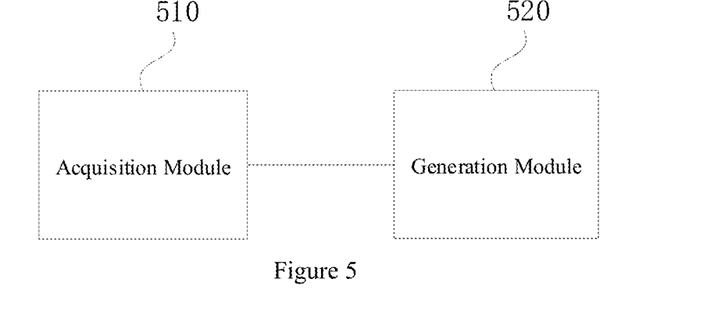
FIG. 5 is a schematic structural diagram of a video generation apparatus in an embodiment of the present disclosure.

FIG. 5 is a schematic structural diagram of a video generation apparatus in an embodiment of the present disclosure. The video generation device provided by the embodiment of the present disclosure can be configured in a client. The video generation apparatus specifically includes:

an acquisition module 510 for acquiring, in an image editing process of subjecting an initial image to a series of image editing operations to obtain a target image, initial key frames which are intermediate state images between the initial image and the target image in the image editing process, wherein, a different initial key frame is an intermediate state image when a different image editing operation of the series of image editing operations is triggered in the image editing process, and the intermediate state image presents an editing effect of the corresponding image editing operation; a generating module 520 for generating a target video according to the initial key frames, so as to record an image editing process of the target image.

Optionally, the acquisition module 510 includes:

a determination unit for determining, when performing an image editing operation for the initial image, a type of the image editing operation; a frame extraction unit for acquiring an initial key frame at the time of triggering the image editing operation, if the image editing operation is of a first type; acquiring an initial key frame when receiving a effectiveness confirming instruction or an image editing operation switching instruction after triggering the image editing operation, if the image editing operation is of a second type, wherein, the first type of image editing operation is an operation of changing an original content of the initial image; the second type of image editing operation is an operation of superimposing an effect on an original content of the initial image without changing the original content.

Optionally, the acquisition module 510 further includes: a first processing module for performing a sparsification process on the initial key frames, if the number of the initial key frames reaches a first preset threshold and all the initial key frames are acquired at the time of triggering the first type of image editing operations, so as to control the number of the initial key frames to be less than the first preset threshold.

Optionally, the acquisition module 510 further includes: a comparison module for comparing, for the target key frame among the initial key frames, a pixel value of a pixel point in the target key frame with a pixel value of a pixel point in a historical key frame closest to the target key frame, wherein, the historical key frame is an initial key frame at a previous time of the time corresponding to the target key frame; and an identification module for determining the target key frame as a valid frame, if the number of pixel points with changed pixel value reaches a second preset threshold. Accordingly, the generation module 520 is specifically used for generating a target video according to the valid frame among the initial key frames.

Optionally, if the target key frame is a firstly acquired initial key frame, then the historical key frame and the target key frame are the same key frame; if the target key frame is not a firstly acquired initial key frame, then the historical key frame is a valid frame at a previous time of the time corresponding to the target key frame.

Optionally, the acquisition module 510 further includes: a second processing module for performing a sparsification process on the initial key frames based on a preset sparsification policy, if the number of the initial key frames reaches a third preset threshold, so as to control the number of the initial key frames to be less than the third preset threshold.

Optionally, the second processing module includes a determination unit for determining two initial key frames with adjacent acquisition times from the initial key frames; and a filtering unit for filtering out one of the two initial key frames.

Optionally, the intermediate state image further presents a trigger action corresponding to the image editing operation.

The video generation apparatus provided by the embodiment of the present disclosure can execute the steps executed by the client in the video generation method provided by the method embodiment of the present disclosure, and has executed steps and beneficial effects which are not described herein again.

Figure 6:
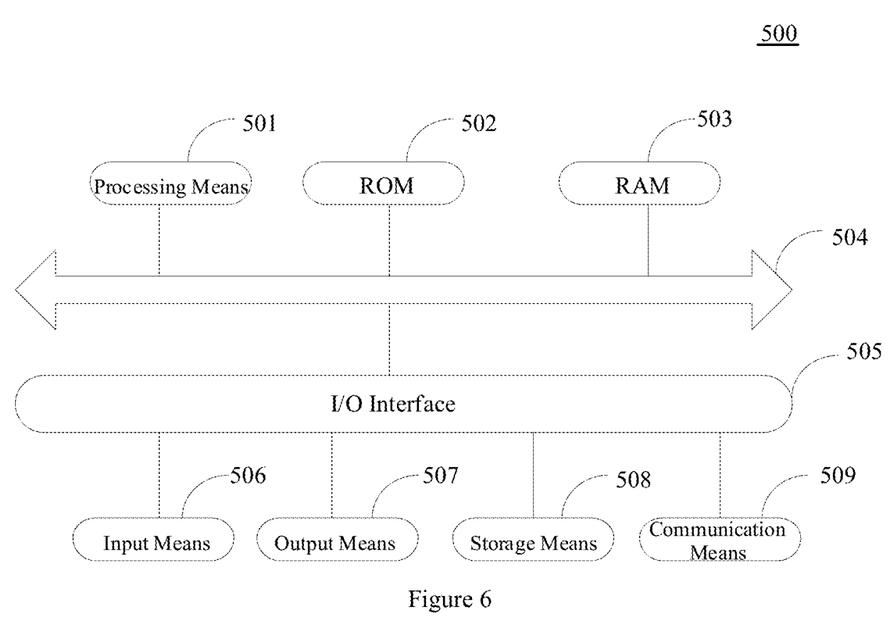
FIG. 6 is a schematic structural diagram of an electronic device in an embodiment of the present disclosure.

FIG. 6 is a schematic structural diagram of an electronic device in an embodiment of the present disclosure. Referring now specifically to FIG. 6, a schematic structural diagram adapted for implementing an electronic device 500 in an embodiment of the present disclosure is shown. The electronic device 500 in the embodiment of the present disclosure can include, but is not limited to, a mobile terminal such as a mobile phone, a notebook computer, a digital broadcast receiver, a personal digital assistant (PDA), a tablet computer (PAD), a portable multimedia player (PMP), a vehicle-mounted terminal (e.g., a vehicle-mounted navigation terminal), a wearable electronic device, and the like, as well as a fixed terminal such as a digital TV, a desktop computer, a smart home device, and the like. The electronic device shown in FIG. 6 is only an example, and should not bring any limitation to the functions and the scope of use of the embodiments of the present disclosure.

As shown in FIG. 6, the electronic device 500 can include a processing means (e.g., a central processor, a graphics processor, or the like) 501 that can execute various suitable actions and processes to implement the method of the embodiments as described in the present disclosure according to a program stored in a Read Only Memory (ROM) 502 or a program loaded from a storage means 508 into a Random Access Memory (RAM) 503. In the RAM 503, various programs and data necessary for the operation of the electronic device 500 are also stored. The processing means 501, the ROM 502, and the RAM 503 are connected to each other via a bus 504. An input/output (I/O) interface 505 is also connected to the bus 504.

Generally, the following means can be connected to the I/O interface 505: an input means 506 including, for example, a touch screen, a touch pad, a keyboard, a mouse, a camera, a microphone, an accelerometer, a gyroscope, and the like; an output means 507 including, for example, a Liquid Crystal Display (LCD), a speaker, a vibrator, and the like; a storage means 508 including, for example, a magnetic tape, a hard disk, and the like; and a communication means 509. The communication means 509 can allow the electronic device 500 to perform wireless or wired communication with other devices so as to exchange data. While FIG. 6 illustrates an electronic device 500 having various means, it should be understood that not all illustrated means are required to be implemented or provided. More or fewer means may be alternatively implemented or provided.

In particular, the process described above with reference to the flow diagram can be implemented as a computer software program, according to the embodiments of the present disclosure. For example, an embodiment of the present disclosure includes a computer program product comprising a computer program carried on a non-transitory computer readable medium, the computer program containing program code for executing the method illustrated by the flow diagram, thereby implementing the video generation method as described above. In such an embodiment, the computer program can be downloaded and installed from a network through the communication means 509, or installed from the storage means 508, or installed from the ROM 502. The computer program, when executed by the processing means 501, executes the above-described functions defined in the method of the embodiments of the present disclosure.

It is to be noted that the computer readable medium described above in the present disclosure can be a computer readable signal medium or a computer readable storage medium or any combination of both the above. The computer readable storage medium can be, for example, but not limited to, an electronic, magnetic, optical, electromagnetic, infrared, or semiconductor system, apparatus, or device, or any combination of the foregoing. More specific examples of the computer readable storage medium can include, but are not limited to: an electrical connection having one or more wires, a portable computer diskette, a hard disk, a Random Access Memory (RAM), a Read Only Memory (ROM), an Erasable Programmable Read Only Memory (EPROM or flash memory), an optical fiber, a portable Compact Disc Read Only Memory (CD-ROM), an optical storage device, a magnetic storage device, or any suitable combination of the foregoing. In the present disclosure, the computer readable storage medium can be any tangible medium that contains or stores a program for use by or in connection with an instruction execution system, apparatus, or device. In contrast, in the present disclosure, the computer readable signal medium can include a propagated data signal with computer readable program code carried therein, in baseband or as part of a carrier wave. Such a propagated data signal may take any of a variety of forms, including, but not limited to, an electro-magnetic signal, an optical signal, or any suitable combination of the forgoing. The computer readable signal medium can also be any computer readable medium other than the computer readable storage medium and that can communicate, propagate, or transport a program for use by or in connection with an instruction execution system, apparatus, or device. Program code contained on a computer readable medium can be transported using any suitable medium, including but not limited to: electrical wires, optical cables, RF (radio frequency), etc., or any suitable combination of the foregoing.

In some embodiments, the clients and servers can communicate using any currently known or future developed network protocol, such as the HyperText Transfer Protocol (HTTP), and can be interconnected with any form or medium of digital data communication (e.g., a communication network). Examples of the communication network include a Local Area Network ("LAN"), a Wide Area Network ("WAN"), the Internet (e.g., the Internet), and a peer-to-peer network (e.g., an ad hoc peer-to-peer network), as well as any currently known or future developed network.

The above-described computer readable medium can be contained in the above-described electronic device, or can be separate and not incorporated into the electronic device.

The above-described computer readable medium carries one or more programs which, when executed by the electronic device, cause the electronic device to: acquire, in an image editing process of subjecting an initial image to a series of image editing operations to obtain a target image, initial key frames which are intermediate state images between the initial image and the target image in the image editing process, wherein, a different initial key frame is an intermediate state image when a different image editing operation of the series of image editing operations is triggered in the image editing process, and the intermediate state image presents an editing effect of the corresponding image editing operation; generating a target video according to the initial key frames, so as to record an image editing process of the target image.

Optionally, when the above-described one or more programs are executed by the electronic device, the electronic device can also execute other steps described in the above embodiments.

Computer program code for executing operations of the present disclosure can be written in one or more programming languages or a combination thereof. The above-described programming language includes but is not limited to an object oriented programming language, such as Java, Smalltalk, C++, as well as a conventional procedural programming language, such as the "C" programming language or similar programming languages. The program code can be executed entirely on a user computer, partly on the user computer, as a stand-alone software package, partly on the user computer and partly on a remote computer, or entirely on the remote computer or a server. In the circumstance where the remote computer is involved, the remote computer can be connected to the user computer through any type of network, including a Local Area Network (LAN) or a Wide Area Network (WAN), or be connected to an external computer (for example, through the Internet using an Internet service provider).

The flow diagrams and block diagrams in the figures illustrate the architecture, functions, and operations of possible implementations of the system, method and computer program product according to various embodiments of the present disclosure. In this regard, each block in the flow diagrams or block diagrams can represent a module, a segment, or part of code, which contains one or more executable instructions for implementing the specified logical function(s). It should also be noted that, in some alternative implementations, the functions labeled in the block may occur out of the order labeled in the figures. For example, two blocks shown in succession can, in fact, be executed substantially concurrently, or the blocks can sometimes be executed in the reverse order, depending upon the functions involved. It is also to be noted that each or a combination of blocks of the block diagrams and/or flow diagram can be implemented by a special purpose hardware-based system that executes the specified functions or operations, or by a combination of the special purpose hardware and computer instructions.

The involved units described in the embodiments of the present disclosure can be implemented by means of software or hardware. The name of a unit does not in some cases constitute a limitation on the unit itself.

The functions described herein above can be executed, at least in part, by one or more hardware logic components. For example, without limitation, exemplary types of hardware logic components that can be used include: field Programmable Gate Arrays (FPGAs), Application Specific Integrated Circuits (ASICs), Application Specific Standard Products (ASSPs), system on a chip (SOCs), Complex Programmable Logic Devices (CPLDs), and the like.

In the context of the present disclosure, a machine readable medium can be a tangible medium that can contain or store a program for use by or in connection with an instruction execution system, apparatus, or device. The machine readable medium can be a machine readable signal medium or a machine readable storage medium. The machine readable medium can include, but is not limited to, an electronic, magnetic, optical, electromagnetic, infrared, or semiconductor system, apparatus, or device, or any suitable combination of the foregoing. More specific examples of the machine readable storage medium would include an electrical connection based on one or more wires, a portable computer diskette, a hard disk, a Random Access Memory (RAM), a Read Only Memory (ROM), an Erasable Programmable Read Only Memory (EPROM or flash memory), an optical fiber, a portable Compact Disc Read Only Memory (CD-ROM), an optical storage device, a magnetic storage device, or any suitable combination of the foregoing.

According to one or more embodiments of the present disclosure, the present disclosure provides a video generation method, including: acquiring, in an image editing process of subjecting an initial image to a series of image editing operations to obtain a target image, initial key frames which are intermediate state images between the initial image and the target image in the image editing process, wherein a different initial key frame is an intermediate state image when a different image editing operation of the series of image editing operations is triggered in the image editing process, and the intermediate state image presents an editing effect of the corresponding image editing operation; generating a target video according to the initial key frames, so as to record an image editing process of the target image.

According to one or more embodiments of the present disclosure, in the video generation method provided by the present disclosure, optionally, the acquiring, in the image editing process of subjecting an initial image to a series of image editing operations to obtain a target image, initial key frames includes: determining, when performing an image editing operation for the initial image, a type of the image editing operation; acquiring an initial key frame at the time of triggering the image editing operation, if the image editing operation is of a first type; acquiring an initial key frame when receiving a effectiveness confirming instruction or an image editing operation switching instruction after triggering the image editing operation, if the image editing operation is of a second type, wherein the first type of image editing operation is an operation of changing an original content of the initial image; the second type of image editing operation is an operation of superimposing an effect on an original content of the initial image without changing the original content.

According to one or more embodiments of the present disclosure, in the video generation method provided by the present disclosure, optionally, before generating a target video according to the initial key frames, the method further includes: performing a sparsification process on the initial key frames, if the number of the initial key frames reaches a first preset threshold and all the initial key frames are acquired at the time of triggering the first type of image editing operations, so as to control the number of the initial key frames to be less than the first preset threshold.

According to one or more embodiments of the present disclosure, in the video generation method provided by the present disclosure, optionally, before generating a target video according to the initial key frames, the method further includes: comparing, for the target key frame among the initial key frames, a pixel value of a pixel point in the target key frame with a pixel value of a pixel point in a historical key frame closest to the target key frame, wherein, the historical key frame is an initial key frame at a previous time of the time corresponding to the target key frame; determining the target key frame as a valid frame, if the number of pixel points with changed pixel values reaches a second preset threshold; accordingly, the generating a target video according to the initial key frames includes: generating a target video according to the valid frames among the initial key frames.

According to one or more embodiments of the present disclosure, in the video generation method provided by the present disclosure, optionally, if the target key frame is a firstly acquired initial key frame, then the historical key frame and the target key frame are the same key frame; if the target key frame is not a firstly acquired initial key frame, then the historical key frame is a valid frame at a previous time of the time corresponding to the target key frame.

According to one or more embodiments of the present disclosure, in the video generation method provided by the present disclosure, optionally, before the generating a target video according to the initial key frames, the method further includes: performing a sparsification process on the initial key frames based on a preset sparsification policy, if the number of the initial key frames reaches a third preset threshold, so as to control the number of the initial key frames to be less than the third preset threshold.

According to one or more embodiments of the present disclosure, in the video generation method provided by the present disclosure, optionally, the performing a sparsification process on the initial key frames based on a preset sparsification policy so as to control the number of the initial key frames to be less than the third preset threshold includes: determining two initial key frames with adjacent acquisition times from among the initial key frames; filtering out one of the two initial key frames.

According to one or more embodiments of the present disclosure, in the video generation method provided by the present disclosure, optionally, the intermediate state image further presents a trigger action corresponding to the image editing operation.

According to one or more embodiments of the present disclosure, the present disclosure provides a video generation apparatus, including: an acquisition module for acquiring, in an image editing process of subjecting an initial image to a series of image editing operations to obtain a target image, initial key frames which are intermediate state images between the initial image and the target image in the image editing process, wherein a different initial key frame is an intermediate state image when a different image editing operation of the series of image editing operations is triggered in the image editing process, and the intermediate state image presents an editing effect of the corresponding image editing operation; a generation module for generating a target video according to the initial key frames, so as to record an image editing process of the target image.

According to one or more embodiments of the present disclosure, the present disclosure provides an electronic device, including:

one or more processors;
a memory for storing one or more programs;
wherein, the one or more programs, when executed by the one or more processors, cause the one or more processors to implement any said video generation method as provided by the present disclosure.

According to one or more embodiments of the present disclosure, the present disclosure provides a computer readable storage medium with a computer program stored thereon, which, when executed by a processor, implements any said video generation method as provided by the present disclosure.

According to one or more embodiments of the present disclosure, the present disclosure provides a computer program, including:

computer readable instructions which, when executed by a processor, cause the processor to execute one or more steps in any said video generation method.

According to one or more embodiments of the present disclosure, the present disclosure provides a computer program product, including computer readable instructions which, when executed by a processor, cause the processor to execute one or more steps in any said video generation method.

As compared with the related art, the technical solution provided by the embodiments of the present disclosure has at least the following advantages: the video generation method provided by the embodiment of the present disclosure implements the recording of the image editing process, by using the technical means of acquiring, in an image editing process of subjecting an initial image to a series of image editing operations to obtain a target image, initial key frames which are intermediate state images between the initial image and the target image in the image editing process, wherein, a different initial key frame is an intermediate state image when a different image editing operation of the series of image editing operations is triggered in the image editing process, and the intermediate state image presents an editing effect of the corresponding image editing operation and editing action when triggering the corresponding image editing operation; generating a target video according to the initial key frames, so as to record an image editing process of the target image.

The foregoing description is only illustrative of the preferred embodiments of the present disclosure and the technical principles employed. It should be understood by those skilled in the art that the scope of disclosure involved in the present disclosure is not limited to the technical solution formed by a particular combination of the technical features described above, but also encompasses other technical solution formed by any combination of the technical features described above or equivalents thereof without departing from the spirit of the present disclosure, for example, a technical solution formed by a mutual replacement of the above features and the technical features disclosed in the present disclosure (but not limited to) having similar functions.

In addition, while various operations are depicted in a particular order, this should not be understood as requiring that such operations be executed in the particular order shown or in a sequential order. Under certain circumstances, multitasking and parallel processing are possibly advantageous. Likewise, while several specific implementation details are included in the above discussion, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the present subject matter has been described in a language specific to structural features and/or methodological actions, it should be understood that the subject matter defined in the appended Claims is not necessarily limited to the specific features or actions described above. Rather, the specific features and action described above are only example forms for implementing the Claims.

What is claimed is:

1. A video generation method, comprising:
acquiring, in an image editing process of subjecting an initial image to a series of image editing operations to obtain a target image, initial key frames for recording the image editing process, wherein the initial key frames are intermediate state images between the initial image and the target image for recording respective image edition operations of the series of image editing operations in the image editing process, wherein a different initial key frame is an intermediate state image when a different image editing operation of the series of image editing operations is triggered in the image editing process, and the intermediate state image presents an editing effect of a corresponding image editing operation;
generating a target video according to the initial key frames, so as to record the image editing process of the target image.

2. The video generation method according to claim 1, wherein, the acquiring, in the image editing process of subjecting the initial image to the series of image editing operations to obtain the target image, initial key frames for recording the image editing process, comprises:
determining, when performing an image editing operation for the initial image, a type of the image editing operation;
acquiring an initial key frame at a time of triggering the image editing operation, if the image editing operation is of a first type;
acquiring an initial key frame when receiving a effectiveness confirming instruction or an image editing operation switching instruction after triggering the image editing operation, if the image editing operation is of a second type, wherein the first type of image editing operation is an operation of changing an original content of the initial image; the second type of image editing operation is an operation of superimposing an effect on an original content of the initial image without changing the original content.

3. The video generation method according to claim 2, wherein, before the generating a target video according to the initial key frames, the method further comprises:
performing a sparsification process on the initial key frames, if a number of the initial key frames reaches a first preset threshold and all the initial key frames are acquired at the time of triggering the first type of image editing operations, so as to control the number of the initial key frames to be less than the first preset threshold.

4. The video generation method according to claim 1, wherein, before the generating a target video according to the initial key frames, the method further comprises:
comparing, for a target key frame among the initial key frames, a pixel value of a pixel point in the target key frame with a pixel value of a pixel point in a historical key frame closest to the target key frame, wherein the historical key frame is an initial key frame at a previous time of the time corresponding to the target key frame;
determining the target key frame as a valid frame, if a number of pixel points with changed pixel values reaches a second preset threshold;
accordingly, the generating a target video according to the initial key frames comprises:
generating a target video according to the valid frames among the initial key frames.

5. The video generation method according to claim 4, wherein, if the target key frame is a firstly acquired initial key frame, then the historical key frame and the target key frame are a same key frame;
if the target key frame is not a firstly acquired initial key frame, then the historical key frame is a valid frame at a previous time of the time corresponding to the target key frame.

6. The video generation method according to claim 1, wherein, before the generating a target video according to the initial key frames, the method further comprises:
performing a sparsification process on the initial key frames based on a preset sparsification policy, if a number of the initial key frames reaches a third preset threshold, so as to control the number of the initial key frames to be less than the third preset threshold.

7. The video generation method according to claim 6, wherein, the performing a sparsification process on the initial key frames based on a preset sparsification policy so as to control the number of the initial key frames to be less than the third preset threshold comprises:
determining two initial key frames with adjacent acquisition times from the initial key frames;
filtering out one of the two initial key frames.

8. The video generation method according to claim 1, wherein the intermediate state image further presents a trigger action of the corresponding image editing operation.

9. An electronic device, comprising:
one or more processors;
a memory for storing one or more programs;
wherein, the one or more programs, when executed by the one or more processors, cause the one or more processors to implement a video generation method, comprising:
acquiring, in an image editing process of subjecting an initial image to a series of image editing operations to obtain a target image, initial key frames for recording the image editing process, wherein the initial key frames are intermediate state images between the initial image and the target image for recording respective image edition operations of the series of image editing operations in the image editing process, wherein a different initial key frame is an intermediate state image when a different image editing operation of the series of image editing operations is triggered in the image editing process, and the intermediate state image presents an editing effect of a corresponding image editing operation;
generating a target video according to the initial key frames, so as to record the image editing process of the target image.

10. The electronic device according to claim 9, wherein, the acquiring, in the image editing process of subjecting the initial image to the series of image editing operations to obtain the target image, initial key frames for recording the image editing process, comprises:

determining, when performing an image editing operation for the initial image, a type of the image editing operation;

acquiring an initial key frame at a time of triggering the image editing operation, if the image editing operation is of a first type;

acquiring an initial key frame when receiving a effectiveness confirming instruction or an image editing operation switching instruction after triggering the image editing operation, if the image editing operation is of a second type, wherein the first type of image editing operation is an operation of changing an original content of the initial image; the second type of image editing operation is an operation of superimposing an effect on an original content of the initial image without changing the original content.

11. The electronic device according to claim 10, wherein, before the generating a target video according to the initial key frames, the method further comprises:

performing a sparsification process on the initial key frames, if a number of the initial key frames reaches a first preset threshold and all the initial key frames are acquired at the time of triggering the first type of image editing operations, so as to control the number of the initial key frames to be less than the first preset threshold.

12. The electronic device according to claim 9, wherein, before the generating a target video according to the initial key frames, the method further comprises:

comparing, for a target key frame among the initial key frames, a pixel value of a pixel point in the target key frame with a pixel value of a pixel point in a historical key frame closest to the target key frame, wherein the historical key frame is an initial key frame at a previous time of the time corresponding to the target key frame;

determining the target key frame as a valid frame, if a number of pixel points with changed pixel values reaches a second preset threshold;

accordingly, the generating a target video according to the initial key frames comprises:

generating a target video according to the valid frames among the initial key frames.

13. The electronic device according to claim 12, wherein, if the target key frame is a firstly acquired initial key frame, then the historical key frame and the target key frame are a same key frame;

if the target key frame is not a firstly acquired initial key frame, then the historical key frame is a valid frame at a previous time of the time corresponding to the target key frame.

14. The electronic device according to claim 9, wherein, before the generating a target video according to the initial key frames, the method further comprises:

performing a sparsification process on the initial key frames based on a preset sparsification policy, if a number of the initial key frames reaches a third preset threshold, so as to control the number of the initial key frames to be less than the third preset threshold.

15. A non-transitory computer readable storage medium with a computer program stored thereon, which, when executed by a processor, implements a video generation method comprising:

acquiring, in an image editing process of subjecting an initial image to a series of image editing operations to obtain a target image, initial key frames for recording the image editing process, wherein the initial key frames are intermediate state images between the initial image and the target image for recording respective image edition operations of the series of image editing operations in the image editing process, wherein a different initial key frame is an intermediate state image when a different image editing operation of the series of image editing operations is triggered in the image editing process, and the intermediate state image presents an editing effect of a corresponding image editing operation;

generating a target video according to the initial key frames, so as to record the image editing process of the target image.

16. The non-transitory computer readable storage medium according to claim 15, wherein, the acquiring, in the image editing process of subjecting the initial image to the series of image editing operations to obtain the target image, initial key frames for recording the image editing process, comprises:

determining, when performing an image editing operation for the initial image, a type of the image editing operation;

acquiring an initial key frame at a time of triggering the image editing operation, if the image editing operation is of a first type;

acquiring an initial key frame when receiving a effectiveness confirming instruction or an image editing operation switching instruction after triggering the image editing operation, if the image editing operation is of a second type, wherein the first type of image editing operation is an operation of changing an original content of the initial image; the second type of image editing operation is an operation of superimposing an effect on an original content of the initial image without changing the original content.

17. The non-transitory computer readable storage medium according to claim 16, wherein, before the generating a target video according to the initial key frames, the method further comprises:

performing a sparsification process on the initial key frames, if a number of the initial key frames reaches a first preset threshold and all the initial key frames are acquired at the time of triggering the first type of image editing operations, so as to control the number of the initial key frames to be less than the first preset threshold.

18. The non-transitory computer readable storage medium according to claim 15, wherein, before the generating a target video according to the initial key frames, the method further comprises:

comparing, for a target key frame among the initial key frames, a pixel value of a pixel point in the target key frame with a pixel value of a pixel point in a historical key frame closest to the target key frame, wherein the historical key frame is an initial key frame at a previous time of the time corresponding to the target key frame;

determining the target key frame as a valid frame, if a number of pixel points with changed pixel values reaches a second preset threshold;

accordingly, the generating a target video according to the initial key frames comprises:

generating a target video according to the valid frames among the initial key frames.

19. The non-transitory computer readable storage medium according to claim 18, wherein, if the target key frame is a firstly acquired initial key frame, then the historical key frame and the target key frame are a same key frame;

if the target key frame is not a firstly acquired initial key frame, then the historical key frame is a valid frame at a previous time of the time corresponding to the target key frame.

20. The non-transitory computer readable storage medium according to claim 15, wherein, before the generating a target video according to the initial key frames, the method further comprises:

performing a sparsification process on the initial key frames based on a preset sparsification policy, if a number of the initial key frames reaches a third preset threshold, so as to control the number of the initial key frames to be less than the third preset threshold.

* * * * *